Oct. 25, 1949.   L. C. SOKOL   2,485,933
MATERIAL LOADER AND CONTROL
Filed Sept. 23, 1946   4 Sheets-Sheet 3
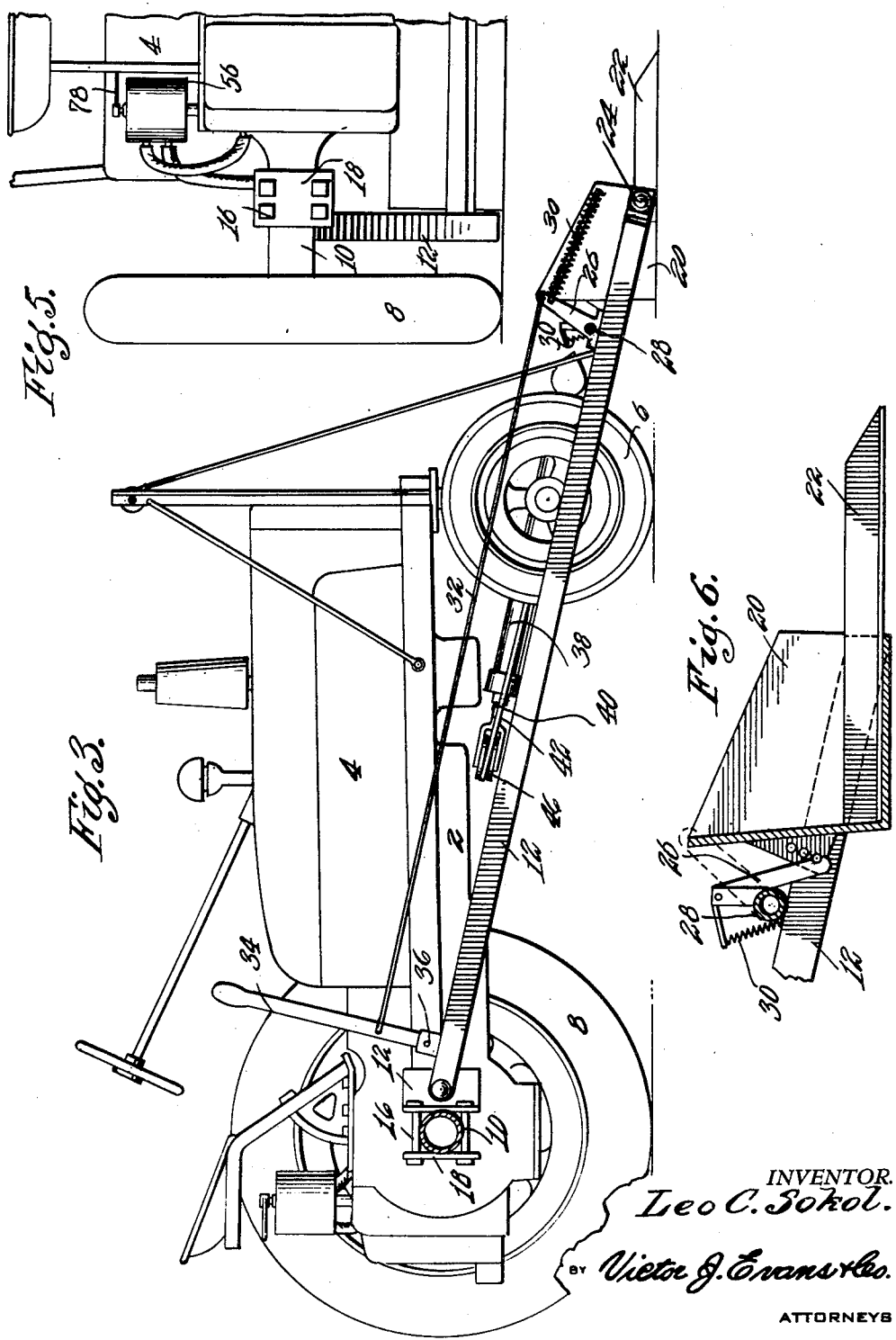
INVENTOR.
Leo C. Sokol.
BY Victor J. Evans & Co.
ATTORNEYS

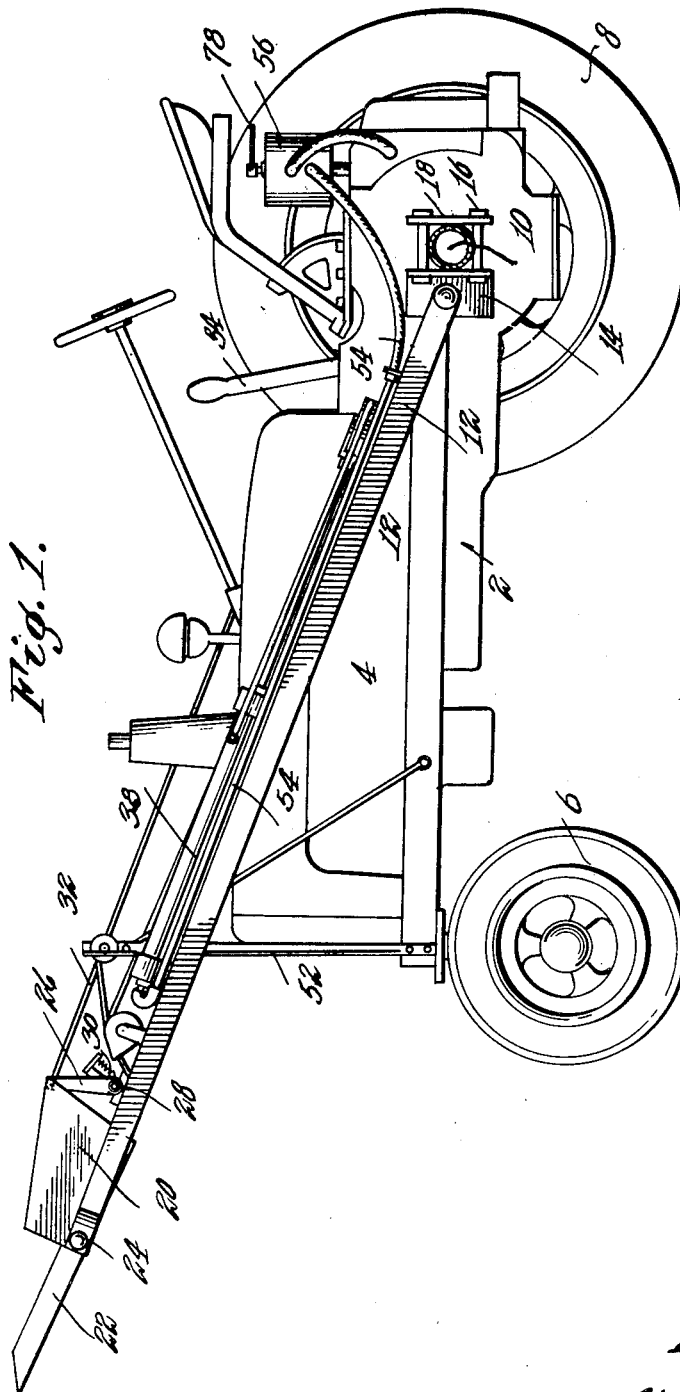

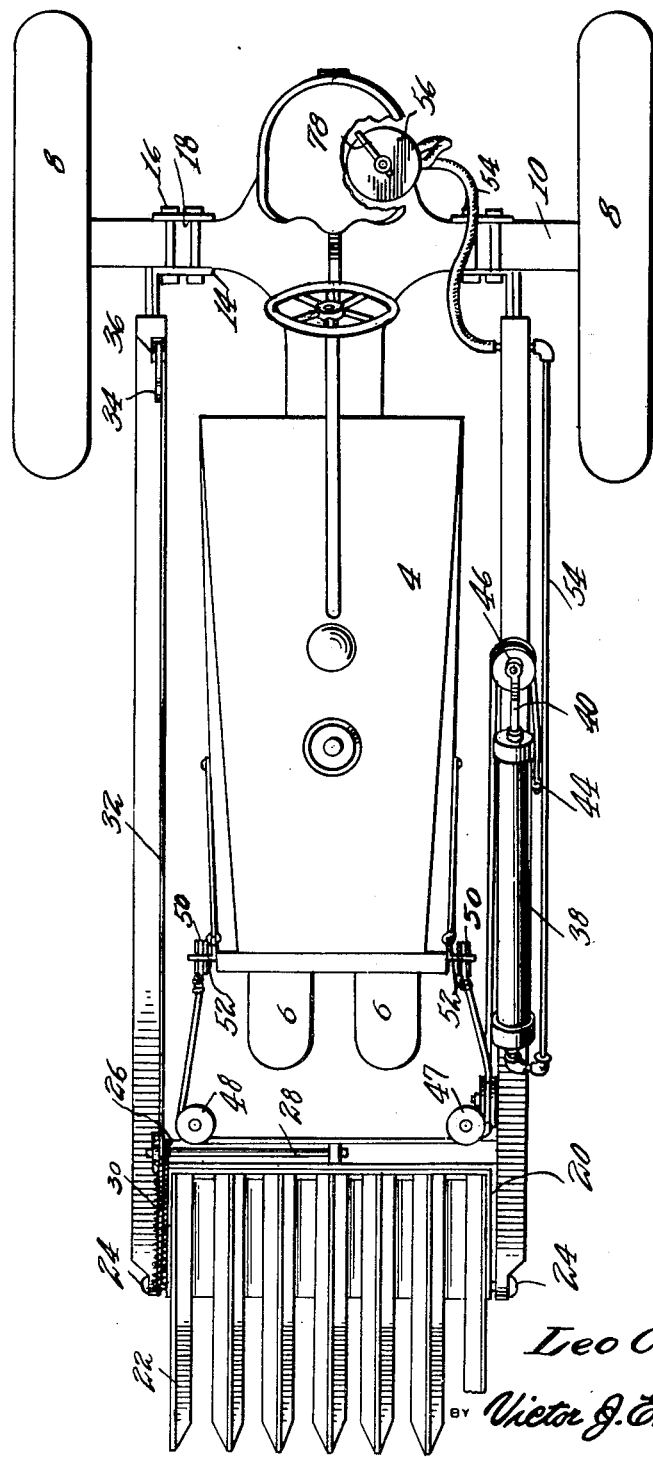

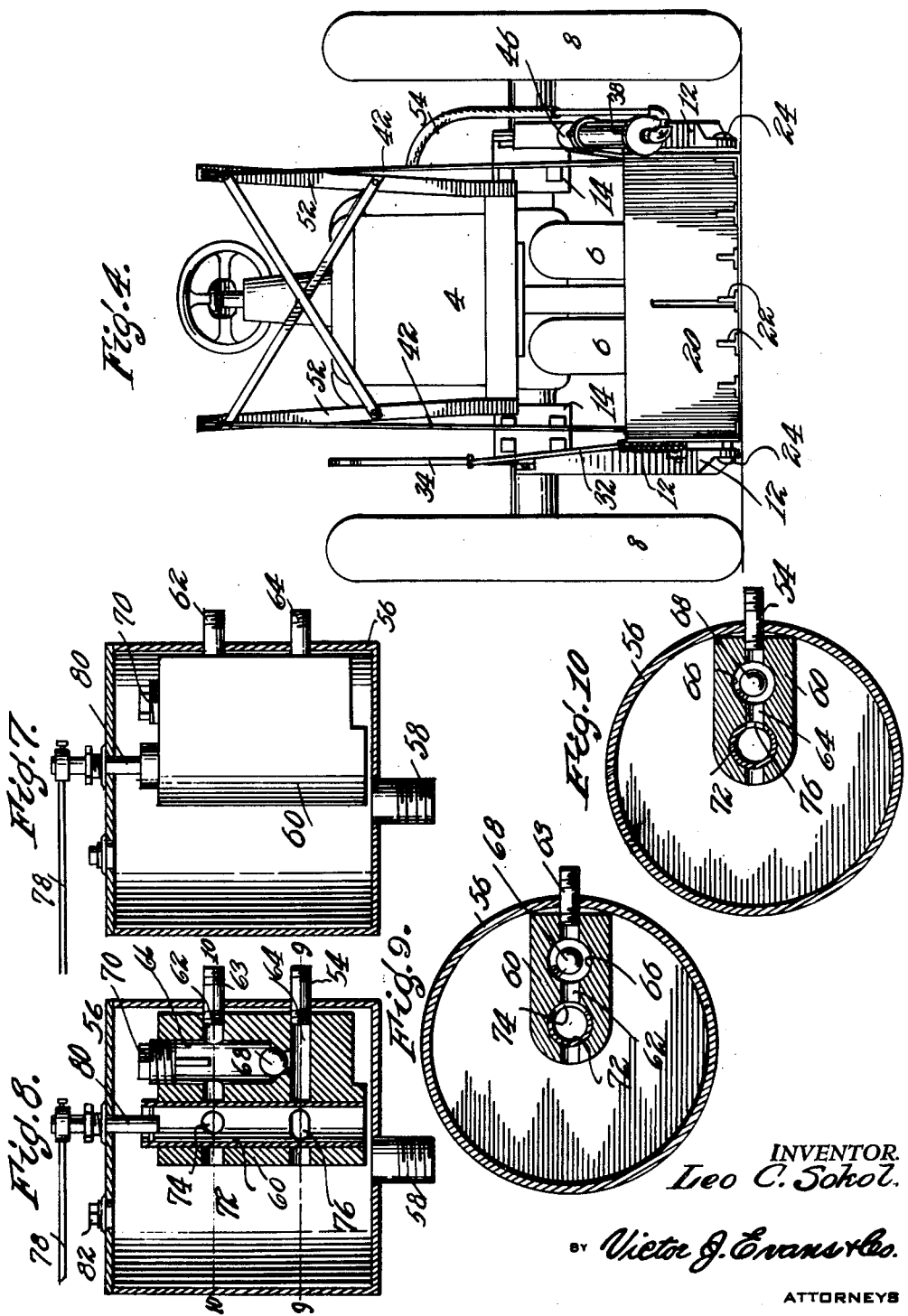

Patented Oct. 25, 1949

2,485,933

UNITED STATES PATENT OFFICE 2,485,933

MATERIAL LOADER AND CONTROL

Leo C. Sokol, Duncan, Nebr.

Application September 23, 1946, Serial No. 698,686

3 Claims. (Cl. 214—140)

My present invention relates to an improved material loader and control of the type particularly adapted for use in conjunction with a powered tractor of the farm type, wherein the hydraulic pressure developed by the tractor engine may be employed to elevate the loader, and the control therefore embodies a novel combination and arrangment of parts providing effective control means for the loader.

In the accompanying drawings I have illustrated one complete example of the physical embodiment of my invention according to the best mode I have thus far devised but it will be understood that various changes and alterations may be made in the exemplified structure without departing from the spirit of the appended claims.

In the drawings:

Figure 1 is a side elevational view of a tractor embodying the loader and control of my invention.

Figure 2 is a top plan view thereof.

Figure 3 is a side elevational view with the loader in receiving position.

Figure 4 is a front elevational view.

Figure 5 is a partial rear elevational view.

Figure 6 is a detail view of the scoop.

Figure 7 is a vertical sectional view of the control for the loader.

Figure 8 is a vertical sectional view through the valve body therein.

Figure 9 is a horizontal sectional view at line 9—9 of Figure 8; and

Figure 10 is a horizontal sectional view at line 10—10 of Figure 8.

Referring now to the drawings wherein like numbers indicate like parts I have illustrated my invention incorporated in the tractor 2 having an engine 4, front wheels 6 and rear wheels 8. The tractor is of conventional design and construction and is formed with a rear axle 10 to which the longitudinally extending arms 12 are pivotally secured by means of the bracket 14 secured to the axle by bolts 16 and the plate 18.

The forward ends of the arms 12 connect with the scoop 20 having tines 22 and pivotally mounted on the arms 12 as at 24.

A trip 26 for the scoop is located on the shaft 28 and the springs 30 urge the scoop into loading position. The rod 32 connects with the lever 34 pivotally mounted on the tractor at 36 provides for the operation of the trip to release the loaded scoop and dump the contents.

The elevating means for the scoop and the tines comprises a hydraulic cylinder 38 having a piston 40, and the line or cable 42 is secured to the cylinder as at 44 and passes over the sheave 46 on the piston rod, and thence to the sheaves 47 and 48, and the cable is anchored as at 50 on the upright standards 52 on the tractor. Thus the extended movement of the piston will move the cable on the sheaves and will elevate the scoop.

The pipe 54 connects the inlet end of the cylinder with the control housing 56 of my invention and the housing consisting preferably of a metal drum is mounted on the pipe 58 which may if preferred lead to an additional fluid reservoir. The housing however comprises a reservoir for the fluid and within the housing I employ a solid valve body 60 formed with an inlet passage 64 communicating through pipe 54 with a gear pump on the tractor (not shown), and outlet passage 62 in the valve body communicates with the pipe 63 to the cylinder.

A vertical communicating passage 66 connects the inlet and outlet passages, and this vertical passage is formed with a ball valve operable by pressure from the cylinder as the piston is forced by gravity back into the cylinder when the pressure from the pump is released.

A plug 70 closes the upper end of the vertical passage and the valve sleeve 72 is located in a vertical opening in the valve body and this sleeve is formed with port 74 aligned with the passage 62, and an elongated port 76 is aligned with the passage 64, and these ports are so located in the sleeve as to be selectively operable to open one passage at a time.

The shaft 80 connected with the sleeve is actuated by the handle 78 and the plug 82 permits the inspection and filling of the reservoir as necessary.

When the handle and sleeve is actuated to close the passages 62 and 64 the fluid under pressure will pass through the valve body past bar 68 to the cylinder to actuate the piston and elevate the scoop. To lower the scoop the valve sleeve is turned to position to open the passage 62 and the fluid will return under pressure from the cylinder load. To maintain the scoop in elevated position for a period of time, the sleeve is held closed over passage 62 and passage 64 opened and the ball valve will not open due to the pressure on the opposite side from the pump.

From the above description of the operation and construction of my invention it should be apparent that a simple and effective control and material handler has been presented, and by the simple manipulation of the single valve handle the scoop will be elevated and lowered. The manual tripping control completes the operating mechanism and the use of the structure of my invention will increase the efficiency of the farm operations.

Having thus fully described my invention what I claim as new and desire to secure by Letters Patent is:

1. In a material loader attachment for tractors and the like, the combination, which comprises a pair of parallel beams positioned on opposite sides of a tractor, means pivotally mounting the rear ends of the beams on the rear axle of the tractor with the forward ends of the beams extending beyond the forward end of the tractor, a scoop with forwardly extending tines positioned between the forward ends of the beams, means pivotally mounting the scoop in the ends of the beams, a latch for holding the scoop in loading position, a hand lever pivotally mounted on one of the beams for actuating the latch to release the scoop, said hand lever adapted to return the scoop to loading position, vertically disposed posts mounted on the forward end of the tractor, a hydraulic cylinder having a piston rod with a pulley in the end thereof mounted on one of said parallel beams, cables with one end anchored to one of the beams and the other ends anchored to the upper ends of the posts trained over the pulley of the piston rod and pulleys on the beams for elevating the scoop as the piston rod moves out of the cylinder, and a control valve on the tractor for controlling the flow of fluid to the hydraulic cylinder.

2. A material loader attachment for tractors and the like comprising a pair of parallel beams positioned on opposite sides of the tractor, means pivotally mounting the rear ends of the beams on the rear axle of the tractor with the forward ends of the beams extending beyond the forward end of the tractor, a scoop with forwardly extending tines positioned between the forward ends of the beams, means pivotally mounting the scoop in the ends of the beams, a latch for holding the scoop in loading position, a hand lever pivotally mounted on one of the beams for actuating the latch to release the scoop, said hand lever adapted to return the scoop to loading position, vertically disposed posts mounted on the forward end of the tractor, a hydraulic cylinder having a piston rod with a pulley in the end thereof mounted on one of said parallel beams, cables anchored to the upper ends of the posts and cylinder adapted to elevate the scoop as pressure is applied to the cylinder, means for supplying fluid under pressure to the cylinder, and a control valve positioned on the tractor through which the fluid is supplied to the cylinder or recirculated to the supplying means.

3. In a hydraulic loader for tractors and the like, an enclosed housing connected in the fluid supply line to the loader, a valve body positioned in said housing having a connection through the housing to a fluid supply and also a connection through the housing to the loader, said housing having a vertically disposed bore therethrough intercepting the said connections to the fluid supply and loader, a cylindrical valve in the bore having openings therethrough for closing both of said connections or opening one or both of said connections to the interior of the housing, means actuating the cylindrical valve from the exterior of the housing, a by-pass in the valve body between the supply and loader connections, and a check valve in said valve body preventing return of fluid to the supply connection.

LEO C. SOKOL.

REFERENCES CITED

The following references are of record in the file of this patent:

UNITED STATES PATENTS

| Number | Name | Date |
|---|---|---|
| 1,240,617 | Stevens | Sep. 18, 1917 |
| 1,273,618 | Julien et al. | July 23, 1918 |
| 1,910,766 | Hobson | May 23, 1933 |
| 1,974,775 | Gorsuch et al. | Sep. 25, 1934 |
| 2,026,853 | Smith | Jan. 7, 1936 |
| 2,293,906 | Kvavle et al. | Aug. 25, 1942 |
| 2,397,042 | Pfost | Mar. 19, 1946 |
| 2,397,303 | Vowless | Mar. 26, 1946 |
| 2,427,461 | Johnson | Sept. 16, 1947 |